Figure 1:
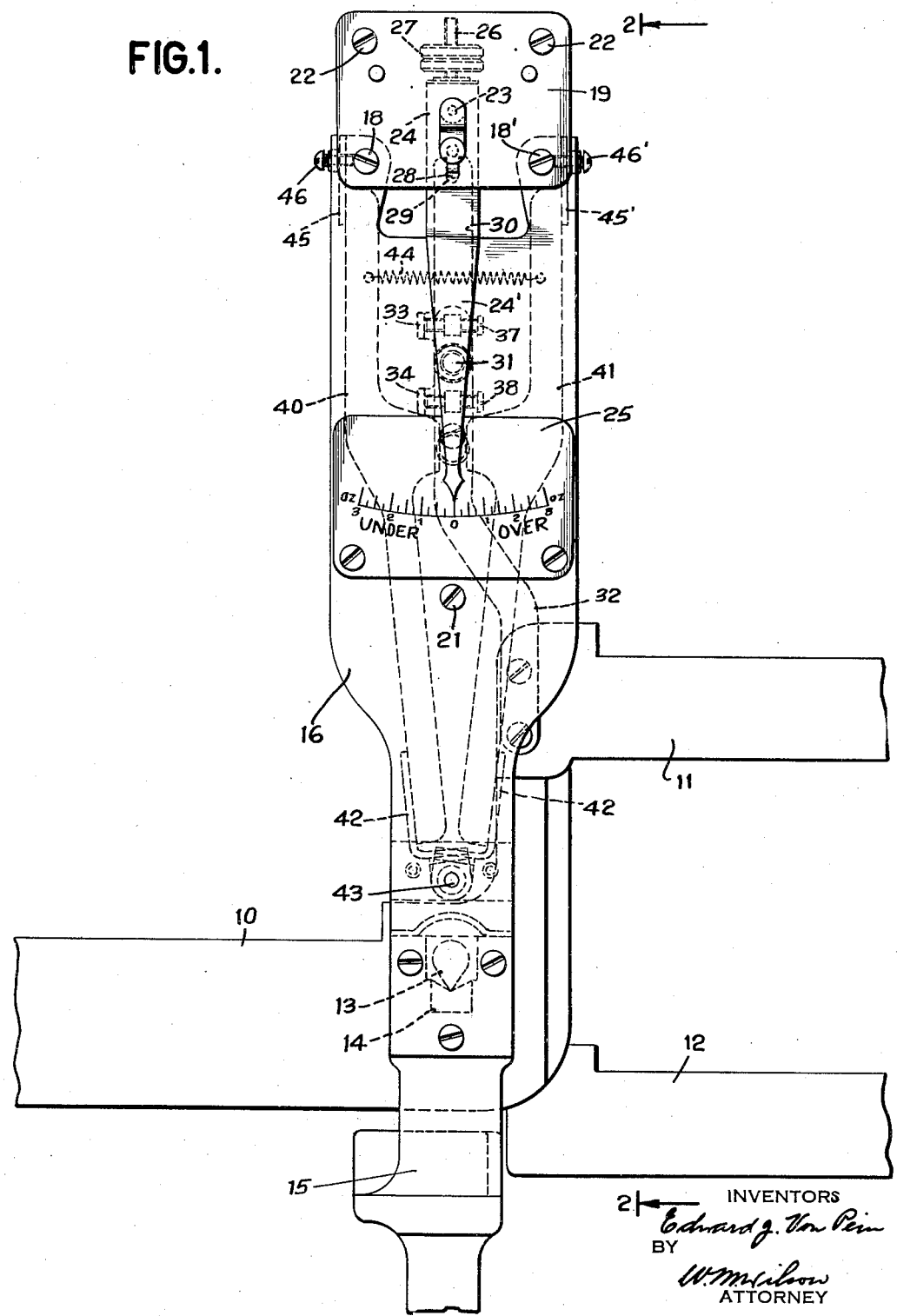

Sept. 13, 1938.   E. J. VON PEIN   2,129,800
SCALE
Filed Dec. 11, 1935   2 Sheets-Sheet 1

Sept. 13, 1938.  E. J. VON PEIN  2,129,800
SCALE
Filed Dec. 11, 1935  2 Sheets-Sheet 2
FIG. 2.
FIG. 3.
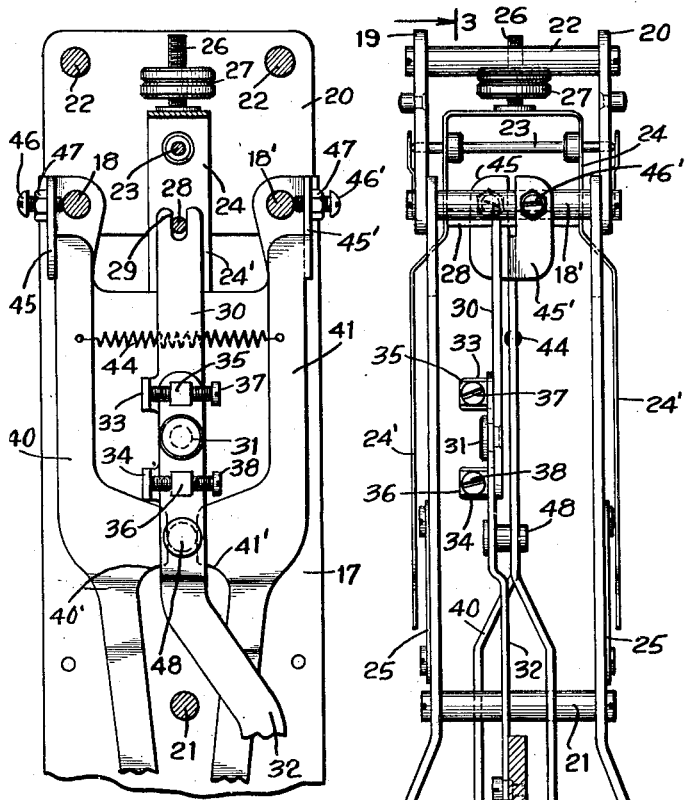
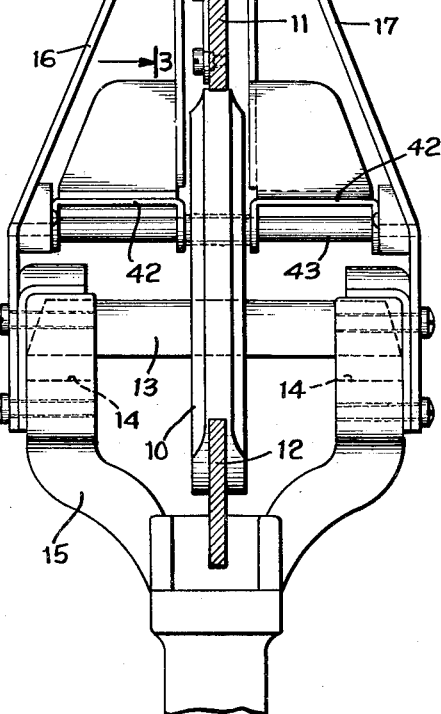
INVENTORS
Edward J. Von Pein
BY
W. M. Wilson
ATTORNEY Patented Sept. 13, 1938

2,129,800

UNITED STATES PATENT OFFICE 2,129,800

SCALE

Edward J. Von Pein, Endicott, N. Y., assignor to International Business Machines Corporation, New York, N. Y., a corporation of New York Application December 11, 1935, Serial No. 53,863

9 Claims. (Cl. 265—58)

This case relates to weighing scales, particularly of the beam type.

The object of the invention is to provide improved automatic counterbalancing means for resisting the final increments of movement of a beam of the even balance type.

Further, the object is to provide a simplified under and over attachment for a beam scale.

Still further, the object is to provide a single coil spring tensioned, as by stretching it, to resist both over and under movements of the beam.

Another object is to provide means for adjusting the tension of a single spring with respect to a pair of instrumentalities, one of which is operated by under and the other of which is operated by over balance movement of the beam.

Still another object is to provide an adjustable connection between a pair of indicator operating arms, one of which is connected to the beam and the other of which is connected to the indicator.

Other objects will appear from the further parts of the specification and from the drawings, in which—

Fig. 1 is a front view of the under and over attachment and a fragment of the beam with which it is associated, Fig. 2 is a section on line 2—2 of Fig. 1, and Fig. 3 is a section on line 3—3 of Fig. 2.

The under and over attachment may be utilized with any even balance beam, the one selected being of the type shown in Patent 1,161,009. This beam 10 has forks 11 and 12 and is fulcrumed by knife edge 13 on bearing block 14 carried by frame post 15.

Secured to opposite sides of post 15 are front and back plates 16 and 17, respectively, to which in turn are secured by bolts 18 and 18′, a pair of short plate extensions 19 and 20. The plates 16 and 17, in addition to being braced by bolts 18 and 18′ are further braced by a cross bolt 21 while plates 19 and 20 are additionally braced by cross bolts 22.

Extension plates 19 and 20 journal between them a shaft 23 to which is fixed an inverted U-shaped yoke 24, the legs of which extend, through slots in plates 16 and 17, exteriorly of the latter plates and form a pair of depending pointers 24′. Fastened to plates 16 and 17 are under and over charts 25 with each of which one of the pointers 24′ coacts to indicate to oppositely facing observers the balance condition of the beam.

The base or cross piece of yoke 24 is provided with an upright screw stem 26 on which is threaded a weight 27. By adjusting the weight 27 along stem 26, the indicator structure including yoke 24 and the parts rigidly connected therewith may be placed in static balance about shaft 23.

The legs of yoke 24 are connected just below shaft 23 by a cross rod 28 passing through a vertical slot 29 formed at the upper end of a vertical bar 30. Bar 30 carries near its lower end a round stud 31 passing through a round hole provided in an arm 32, near the upper end of the latter. The lower part of arm 32 is rigidly attached to fork 11 of beam 10. Bar 30, above and below stud 31, is integrally formed with laterally bent lugs 33 and 34. Arm 32 rigidly carries, opposite the lugs 33 and 34, a pair of nuts 35 and 36.

Threaded into nuts 35 and 36 are screws 37 and 38 for engaging lugs 33 and 34, respectively. By advancing screw 37 and retracting screw 38, bar 30 will be rocked counterclockwise about its pivotal connection 31 to arm 32. By retracting screw 37 and advancing screw 38, bar 30 will be rocked clockwise about pivot 31. By the above means, bar 30, although rigidly carried by arm 32 is nevertheless pivotally adjustable relative to arm 32. When bar 30 is rocked about pivot 31 by adjustment of screws 37 and 38, the bar effects corresponding pivotal adjustment of yoke 24 and pointers 24′. Thus, the pivotal adjustment between elements 30 and 32 has for its purpose, the adjustment of pointers 24′ to the zero or central mark of charts 25 when the beam is in even balance position.

Upon rocking of beam 10 in a clockwise direction, elements 30 and 32 rigidly movable therewith effect counterclockwise rocking of pointers 24′ to the "over" portions of charts 25, indicating that the right arm of the beam is overweighted by the load offsetting weight. Upon counterclockwise rocking of beam 10, pointers 24′ move to the "under" portions of charts 25 indicating that the left arm of the beam is overweighted by the applied load.

Combined with the indicating means are supplementary, automatic load resisting means. The automatic resisting means slows up the under or over movement of the beam as it approaches the even balance or neutral position; at the same time, the automatic resisting means causes the final movements of the beam to be proportional to the magnitudes of small differences between the applied load and the load resisting weights (not shown). Corresponding to such load proportional movements of the beam, will be the movements of the indicators 24′ across chart 25. The latter have their over and under fields calibrated in quarter of ounce increments to coact with the pointers 24′ to indicate, when desired, the automatically counterbalanced under or over weight acting on the beam.

The automatic counterbalancing means comprises a pair of substantially vertically extending arms 40 and 41. The arms are provided at their lower ends with bearing yokes 42 rotatably journaled on a fixed shaft 43 carried by the front and back frame plates 16 and 17.

Between the two arms 40 and 41 and connected to the arms is a horizontally disposed coil spring 44 which urges the arms towards each other. The upper ends of arms 40 and 41 are respectively formed with transversely bent ears 45 and 45'. Threaded into ears 45 and 45' are screws 46 and 46', respectively engaging the fixed rods 18 and 18'. Spring 44 urges arms 40 and 41 towards each other to positions limited by engagement of screws 46 and 46' with rods 18 and 18'. By adjusting either screw 46 or 46', the initial position of its associated arm 40 or 41 may be adjusted. Lock nuts 47 on the screws hold the latter in adjusted positions.

Arms 40 and 41 are formed intermediately with portions 40' and 41' projecting towards each other. Between these portions, is a stud 48 secured to indicator operating arm 32. Upon arm 32 rocking clockwise, stud 48 presses against arm 41 to move the latter clockwise about shaft 43, thereby stretching spring 44 as screw 46' withdraws from rod 18'. The tension of spring 44, as it stretches, holds screw 46 of arm 40 more firmly against rod 18. Upon counterclockwise rocking of arm 32, arm 40 is moved counterclockwise by stud 48, while arm 41 remains fixed in position, as spring 44 stretches. Thus, spring 44 stretches to resist clockwise as well as counterclockwise rocking of arm 32 and beam 10 to which arm 32 is fixed. Simultaneously, pointers 24' indicate the under or over load in ounces counterbalanced by the stretching of spring 44. Since levers 40 and 41 are pivoted on shaft 43, above the fulcrum of beam 10, stud 48 of beam arm 32 will move the levers through a greater angle than the beam movement. Consequently, the points of elements 40 and 41 connected to opposite ends of counterbalancing spring 44 will move through a greater distance than the stud 48 or the beam. Thus movements of the beam effect multiplied movements of levers 40 and 41 to elongate spring 44 more than if the levers and beam had equal amounts of movement. The spring 44, accordingly, acts with greater force and more responsively to movements of the beam than if levers 40 and 41 and the beam moved equal amounts.

By adjustment of screws 46 and 46', the pressure of arms 40 and 41 against stud 48 of arm 32 may be equalized.

It is to be understood that variations, departures, and changes may be made in the preferred form, illustrated and described herein, without departing from the invention. It is therefore desired to be limited only in accordance with the following claims.

What is claimed is:

1. In a scale; a beam movable over or under a neutral position, a stretchable spring, a pair of separately movable elements connected to opposite ends of the spring and solely between them supporting the spring, and means operated by the beam upon over movement of the latter for moving one of said elements to vary the length and resistance of the spring and upon under movement of the beam for moving the other element to vary the length and resistance of the spring.

2. In a scale; a beam movable to either side of an even balance position, a coil spring, means acting in the direction of length of the spring to stretch the latter upon movement of the beam below even balance position, means acting in the direction of length of the spring to stretch the latter upon movement of the beam above even balance position, and a device actuated by the beam for operating both said means.

3. In a scale; a beam movable above or below a neutral position, a coil spring, movable elements, each for supporting one end of the coil spring, and means operated by the beam for moving one or the other of said elements, depending on whether the beam is moving above or below neutral position, for varying the resistance of the spring.

4. In a scale; a beam movable above or below a neutral position, a pair of pivoted arms, a coil spring supported by and connected at opposite ends to said arms, and means operated by movement of the beam above neutral position for rocking one of said arms to vary the resistance of the spring and operated by movement of the beam below neutral position for rocking the other arm to vary the resistance of the spring.

5. In a scale; a beam movable over or under an even balance position, a device moved in one direction by under movements of the beam, a second device moved in the opposite direction by over movements of the beam, and a single coil spring connected at spaced points to both said devices for resisting either the under or over movements of the beam.

6. In a scale such as defined in claim 5, and means for equalizing the pressure of the spring with respect to both said devices.

7. In a scale; a beam movable over or under a neutral position, a single coil spring, means operated by under movement of the beam for stretching the spring by pulling on one end thereof in the direction of length of the spring, and means operated by over movement of the beam for stretching the spring by pulling on the other end thereof lengthwise of the spring, whereby the spring resists over and under movements of the beam.

8. In a scale; a beam movable to either side of an equilibrium position, pivoted means for indicating movements of the beam, and means for operating the indicating means according to movements of the beam including an arm connected to the beam, a second arm tiltably connected to the first-mentioned arm and connected to the pivoted indicating means for operating the latter, and means for adjusting the initial position of the indicating means with respect to the beam comprising a device for fixing the second arm to the first arm at any desired angle of tilt.

9. In an even balance scale; a beam movable in either of opposite directions from a balance position, a generally horizontally disposed single coil spring, and means responsive to either over or under movement of the beam for stretching the spring to cause the latter to resist the beam movement, said means including a plurality of oppositely movable operative connections between said beam and spring movable substantially horizontally in the direction of length of the spring and in response to either over or under movement of the beam for causing stretching of the spring to counterbalance movements of said beam in either of opposite directions.

EDWARD J. VON PEIN.